United States Patent
Lim et al.

(10) Patent No.: US 8,525,645 B2
(45) Date of Patent: Sep. 3, 2013

(54) METHOD OF RECOGNIZING RFID TAG FOR THE PURPOSE OF PREVENTING THROUGHPUT INVERSION AND RFID READER PERFORMING THE SAME

(75) Inventors: Hyuk Lim, Gwangju (KR); Jae-Hyung Jang, Gwangju (KR); Yung-Kwan Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 701 days.

(21) Appl. No.: 12/494,225

(22) Filed: Jun. 29, 2009

(65) Prior Publication Data

US 2010/0026462 A1    Feb. 4, 2010

(30) Foreign Application Priority Data

Aug. 4, 2008    (KR) .................. 10-2008-0076171

(51) Int. Cl.
| | |
|---|---|
| H04Q 5/22 | (2006.01) |
| G05B 23/02 | (2006.01) |
| G08B 13/14 | (2006.01) |
| H04B 7/212 | (2006.01) |
| H04L 12/413 | (2006.01) |
| H04W 4/00 | (2009.01) |
| G06F 17/00 | (2006.01) |
| G06F 19/00 | (2011.01) |
| H04W 40/00 | (2009.01) |

(52) U.S. Cl.
USPC ....... 340/10.1; 340/10.2; 340/10.6; 340/3.41; 340/572.1; 340/572.9; 370/348; 370/445; 370/330; 235/375; 235/385; 455/447

(58) Field of Classification Search
USPC ............... 340/5.8, 572.1–572.9, 568.1, 10.1, 340/10.3, 825, 825.69, 539.1, 539.11, 539.13, 340/10.42, 10.2, 10.32, 10.4, 10.51; 370/330, 370/344, 478, 481, 313, 314, 328, 329, 336, 370/337, 343, 345, 347, 498; 235/492, 380, 235/462.01, 462.08, 462.09, 462.12, 462.16, 235/494, 468, 375, 491, 462.07, 469, 470
See application file for complete search history.

(56) References Cited

U.S. PATENT DOCUMENTS

| | | | | |
|---|---|---|---|---|
| 4,899,389 | A * | 2/1990 | Amazawa | 381/94.8 |
| 2006/0022058 | A1* | 2/2006 | Akiyama et al. | 235/492 |
| 2007/0080788 | A1* | 4/2007 | Manley et al. | 340/10.33 |
| 2007/0126555 | A1* | 6/2007 | Bandy | 340/10.2 |
| 2007/0286227 | A1* | 12/2007 | Koezuka | 370/445 |
| 2008/0074238 | A1* | 3/2008 | Kodialam et al. | 340/10.2 |
| 2008/0088453 | A1* | 4/2008 | Kiji et al. | 340/572.1 |
| 2008/0106383 | A1* | 5/2008 | Choi et al. | 340/10.2 |
| 2008/0150674 | A1* | 6/2008 | Park et al. | 340/3.41 |
| 2008/0150692 | A1* | 6/2008 | Missimer et al. | 340/10.1 |
| 2009/0134975 | A1* | 5/2009 | Eom et al. | 340/10.2 |

* cited by examiner

*Primary Examiner* — Jennifer Mehmood
*Assistant Examiner* — Mirza Alam (57) ABSTRACT

A method of recognizing a tag in an RFID reader includes: obtaining a predetermined frame size in the case where throughput obtained by reflecting a slot length based on the remaining number of tags except for recognized tags within a frame progressing current tag recognition that substantially has a maximum value; and when the current frame size is different from the predetermined frame size, stopping the current progress of frame and changing the current frame size into the expected frame size. The method of recognizing a tag may further include when the current frame size is equal to the expected frame size, changing the current frame size into the frame size that does not cause a throughput inversion phenomenon for the remaining number of tags to be recognized within the frame progressing the current tag recognition. By the throughput inversion phenomenon, the occurrence of throughput loss can be prevented and the tag recognition time is reduced to recognize the tags at high speed.

16 Claims, 9 Drawing Sheets

METHOD OF RECOGNIZING RFID TAG FOR THE PURPOSE OF PREVENTING THROUGHPUT INVERSION AND RFID READER PERFORMING THE SAME

BACKGROUND OF THE INVENTION

1. Field of the Invention

The present invention relates to RFID, and more specifically, to a method of recognizing a tag at high speed by preventing collision in an RFID system.

2. Description of the Related Art

Radio Frequency Identification (RFID), which is one field of automatic recognition such as a barcode, a magnetic sensor, an IC-CARD, etc., means a technology of wirelessly recognizing data stored in a microchip of a tag using a very high frequency (VHF) or a long wave.

In principle, an RFID system receives information stored in a tag through an antenna and recognizes and analyzes it by a reader, making it possible to obtain unique information on articles to which the tag is attached. Furthermore, the RFID system is not affected by the environment such as snow, rain, wind, dust, magnetic flux, etc. because it uses a specific frequency and has an advantage in that the recognition can performed even during movement due to high-speed propagation.

Since the RFID can transmit many data at high speed using a wireless channel, it is considered as a technology capable of replacing the currently used barcode in industry fields needing to recognize products for logistics and distribution fields, financial service, etc. As a result, the RFID has been receiving much attention, is becoming more and more used in automatic recognition system, as a technology that can be implemented in a ubiquitous environment.

However, the RFID has issues in reliability such as recognizing data, standardization of technology, improvement of a read rate and identification speed, etc. One of the most common problems to be solved in the current RFID system is that the recognition efficiency is degraded due to collision between tags. Therefore, in order to improve the read rate and the identification speed, a study on anti-collision protocol is needed.

In the RFID system, the basic process for recognizing the tag is that the reader queries the tag for information and the tag receiving the query signal then transmits its own ID to the reader.

However, when a plurality of tags simultaneously respond to the query of one reader, the reader cannot recognize the tags. This is referred to as tag collision. In the case of the tag collision, since the currently used tag or the tag to be used for a large-scale logistics and distribution is an inexpensive manual tag, the usable anti-collision protocol has many limitations such as complexity of computation, absence of battery, cost increase according to a memory size, etc. Therefore, in order to identify the plurality of tags in real time, a method of processing the tag collision phenomenon is a core technology that determines the performance of the RFID standard protocol, which is referred to as an anti-collision method.

The RFID protocol itself has the anti-collision method suitable for each standard protocol.

The RFID standard protocol at 800 MHz to 960 MHz is 18000-6 Type B and Type C established by the International Standardization Organization (ISO/IEC). Type A and Type C adopt an anti-collision method based on slotted ALOHA protocol that is a probabilistic method and Type B adopts an anti-collision method based on a binary tree that is a deterministic method.

The slotted ALOHA protocol is a time division multiple access technology that prevents the collision by dividing one communication channel into timeslots having a predetermined interval and allowing several communication devices to randomly use each timeslot. The slotted ALOHA protocol can be simply implemented, such that it has been widely used for communication systems.

A Framed slotted ALOH (hereinafter, abbreviated to be "FSA") protocol is one of the most frequently used anti-collision algorithms. The FSA algorithm divides a frame into several timeslots and allows each tag to randomly select one timeslot to transmit its own ID.

Figure 1:
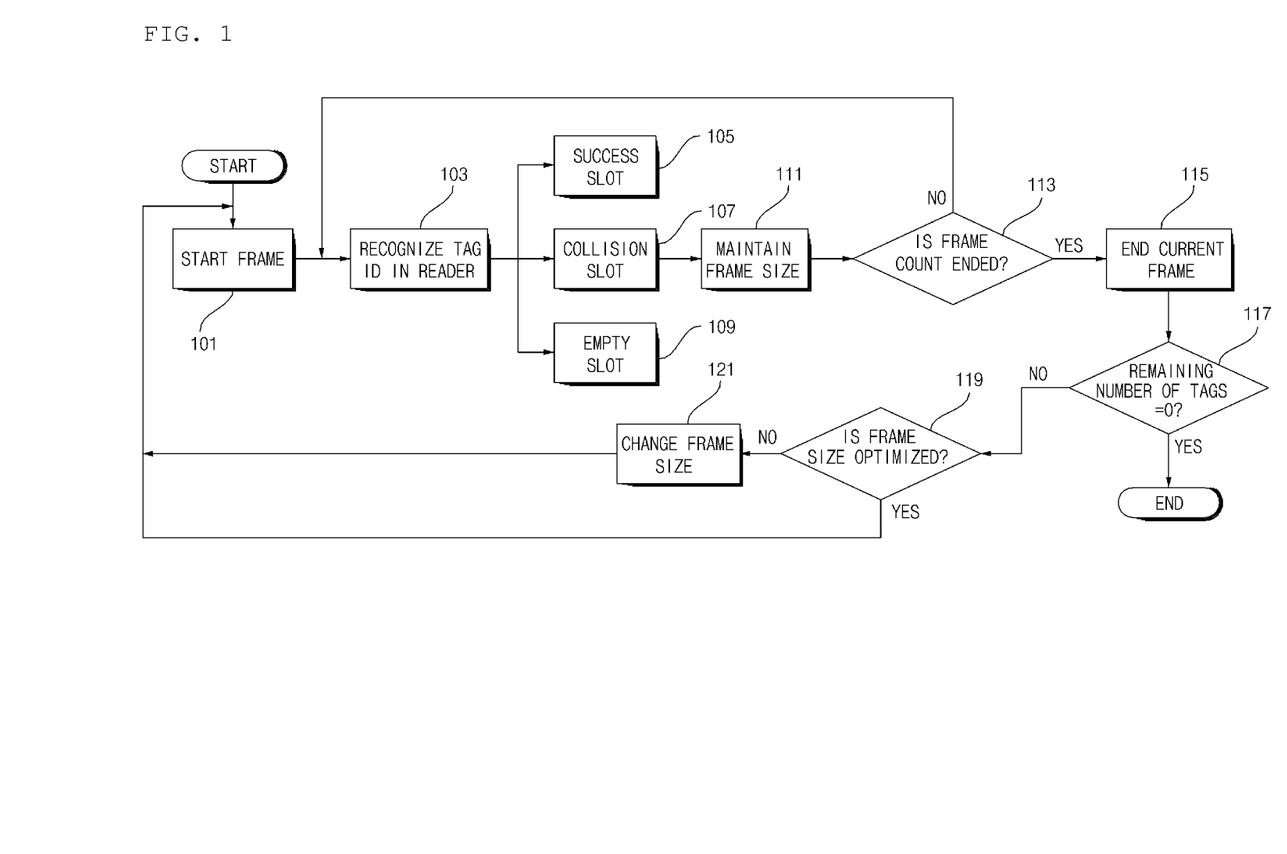
FIG. 1 is a flowchart showing a tag recognition process for explaining the anti-collision algorithm in the Frameed slotted ALOHA (FSA) protocol according to the related art.

FIG. 1 is a flowchart showing a tag recognition process for explaining the anti-collision algorithm in the framed slotted ALOHA (FSA) protocol according to the related art.

The operational principle of the anti-collision algorithm in the FSA protocol according to the related art will be described with reference to FIG. 1. Referring to FIG. 1, if the tag recognition process starts, a frame having a predetermined size starts (step 101) and the reader recognizes the ID of the tag (103). The frame is configured of a plurality of slots and the frame size is equal to the number of slots. The tags receiving the signals respond to the readers and divide the response results of the tags into success 105, collision 107, and idle (or empty) 109. If only one tag responds to one timeslot, the reader recognizes the tag. This is referred to as a success slot. Any tags do not respond to one timeslot, which is referred to an idle slot. More than two tags respond to one timeslot, which is referred to as a collision slot.

A slot counting corresponding to a current frame size ends and then, the current frame ends (111, 113, and 115). After the current frame ends, the anti-collision algorithm according to the related art determines a proper frame size when the number of currently remaining tags is not 0 and starts the frame again (117, 119, and 121). The anti-collision algorithm in the FSA protocol identifies all the tags by repeating the above method.

When the FSA protocol according to the related art seeks an optimal frame size for the number of tags to be currently recognized assume that all the slot sizes are the same. Therefore, when the number of tags is N and access probability is p, throughput $TH_{FSA}$ in the FSA protocol according to the related art is represented by the following Equation 1.

$$TH_{FSA}(N,p) = N \times p \times (1-p)^{N-1} \quad \text{[Equation 1]}$$

The optimal frame size obtained by Equation 1 is the same as the number N of tags. The optimal frame size obtained by the above Equation has a minimum number of slots, but does not have a minimum recognition time.

Figure 7:
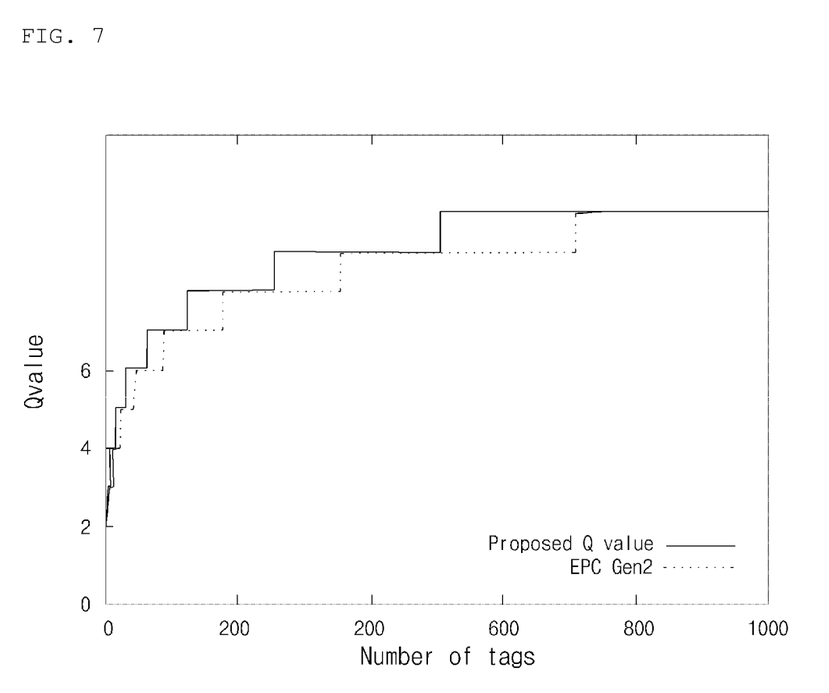
FIG. 7 is graph showing the Q value obtained by the FSA protocol according to the related art and the Q value minimizing the tag recognition time obtained by the method in consideration of the slot length according to the embodiment of the present invention.

In addition, as shown in FIG. 7, a phenomenon that the throughput is degraded during the progress of the current frame occurs. In particular, when the frame size is changed into an exponent of 2, similar to a Q algorithm, a throughput inversion phenomenon occurs, such that there is a problem in that throughput loss occurs.

SUMMARY OF THE INVENTION

In order to solve the above problems, a first object of the present invention provides a method of recognizing an RFID tag to reduce a tag recognition time and prevents a throughput inversion phenomenon.

Further, a second object of the present invention provides an RFID reader to reduce a tag recognition time and prevents a throughput inversion phenomenon.

In order to achieve the first object of the present invention, a method of recognizing a plurality of REID tags in an RFID reader includes: obtaining an expected frame size in the case where throughput obtained by reflecting a slot length based on the remaining number of tags except for recognized tags within a frame progressing current tag recognition substantially has a maximum value; and when the current frame size is different from the expected frame size, stopping the current progress of frame and changing the current frame size into the expected frame size. Obtaining the expected frame size may be performed when a tag response result is a success slot. The method of recognizing a plurality of tags in an RFID reader may further include: when the current frame size is equal to the expected frame size, changing the current frame size into the frame size that does not cause a throughput inversion phenomenon for the remaining number of tags which are to be recognized within the frame progressing the current tag recognition. The throughput obtained by reflecting the slot length may be obtained by a rate of a success slot with respect to all the success, collision, and idle slots using the success, collision, and idle slot lengths. The current frame size and the expected frame size may use a Q value corresponding to the frame size obtained by applying a Q algorithm, wherein the frame size being $2^Q$.

In order to achieve the second object, an RFID reader includes: a transceiver that transmits and receives signals to and from a plurality of RFID tags; and a controller that obtains a predetermined frame size in the case where throughput obtained by reflecting a slot length based on the remaining number of tags except for recognized tags within a frame progressing current tag recognition that substantially has a maximum value and when the current frame size is different from the expected frame size, stops the current progress of frame and changes the current frame size into the predetermined frame size.

Unlike the FSA anti-collision algorithm according to the related art, the method for recognizing a tag according to the present invention as described above is applied when obtaining the optimal frame length by reflecting the slot length according to the tag response results, thereby obtaining the frame size capable of minimizing the tag recognition time. In addition, in order to prevent the throughput inversion phenomenon within the frame owned by the FSA anti-collision algorithm according to the related art, the current frame size is changed into the frame size that does not cause the throughput inversion phenomenon, during the tag recognition. As a result, even though the RFID system used the slot length different from the standard length, the optimized frame size can be obtained.

Further, the present invention can prevent the occurrence of the throughput loss due to the throughput inversion phenomenon, such that it reduces the tag recognition time, making it possible to recognize the tags at high speed.

Moreover, in the large-scale logistics and distribution system, the tags can be recognized at high speed, making it possible to reduce the time required for logistics.

Further, the tags can be recognized at high speed and are applied for the mobile RFID system, such that the user having the mobile RFID reader can obtain the information from the RFID tag, if necessary, even while moving without stopping in the specific area.

DETAILED DESCRIPTION OF THE PREFERRED EMBODIMENTS

Although the present invention can be variously modified and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention. In the following description and drawings, like components refer to like reference numerals.

Terms such as 'first', 'second', 'A', 'B', etc. can be used to describe various components, but the components are not limited to the terms. Terms described in the specification is used to discriminate one component from other components. For example, the first component may be called the second component without departing from the scope of the present invention. Likewise, the second component may be called the first component. The term 'and/or' includes a combination of a plurality of items or any one of a plurality of terms.

When any components are "connected" or "coupled" to other components, it is to be understood that the components may be directly connected or coupled to other components, but there is another component therebetween. On the other hand, when any components are "directly connected" or "directly coupled" to other components, it is to be understood that there is no other component therebetween.

The terms used in the specification is used to describe only specific embodiments and is not intended to limit the present invention. The singular forms are intended to include the plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meaning of the context of the related art, and they should not be ideally or excessively defined formally unless the context clearly dictate otherwise.

Hereinafter, exemplary embodiments of the present invention will be described in detail with reference to the accompanying drawings.

A method for recognizing a tag according to one exemplary embodiment of the present invention first obtains a slot length according to tag response and then uses the slot length according to the tag response to obtain an optimal frame length, thereby reducing a tag recognition time in a reader.

Figure 2:
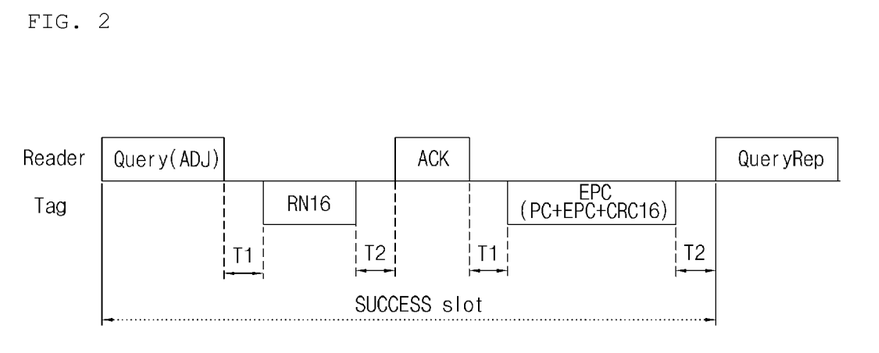
FIGS. 2 to 4 are conceptual diagrams showing each configuration of success, collision, and idle slots in EPC Generation 2.
Figure 3:
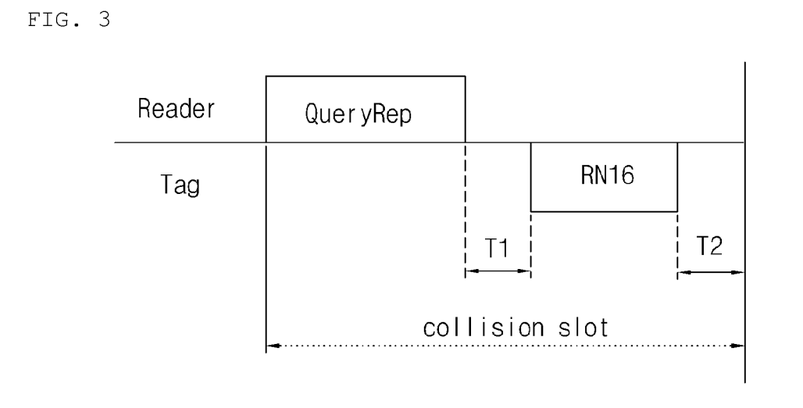
Figure 4:
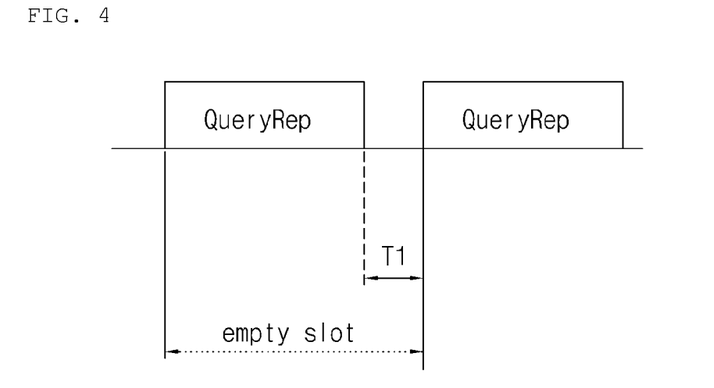

FIGS. 2 to 4 are conceptual diagrams showing each configuration of success, collision, and idle slots in EPC Generation 2.

Referring to FIGS. 2 to 4, the slot length according to the tag response is first defined. According to the tag response, a timeslot has the response of success, collision, and idle. According to EPC Generation 2 standard, the success slot has a configuration as shown in FIG. 2, the collision slot has a configuration as shown in FIG. 3, and the idle slot has a configuration as shown in FIG. 4.

Query command is used in a first frame and includes a Q value in order to determine a random number that allows the tag to select the response. RN 16 performs a role of uniquely assigning an identification number in order to identify one tag. When RN16 values of two or more tags are the same, the collision occurs. The sum of PC CRC 16 and EPC indicates data of one tag. T1 and T2 are needed for synchronization.

The slot length according to three reaction states is represented by the following Equation 2.

$$T_S = T_{Query} + T_{T1} + T_{RN16} + T_{T2} + T_{ACK} + T_{T1} + T_{PC} + T_{EPC} + T_{CRC16} + T_{T2}$$

$$T_C = T_{Query} + T_{T1} + T_{RN16} + T_{T2}$$

$$T_E = T_{Query} + T_{T1}$$ [Equation 2]

where Ts is a success slot length, Tc is a collision slot length, and $T_E$ is an idle slot length. For example, as shown in FIG. 2, a total slot length of one success slot can be obtained by a sum of a slot length ($T_{Query}$) of the Query command, T1, a slot length ($T_1$) of RNC16 code, T2, a slot length ($T_{ACK}$) of ACK command, T1, a slot length ($T_{PC}$) of PC information, a slot length ($T_{EPC}$) of EPC information, a slot length ($T_{CRC}$) of CRC 16, and T2.

The following table 1 is a table that represents a length of slot components of each command $T_1$, $T_2$, RNC16, EPC, etc. in EPC Generation 2.

TABLE 1

|  | EPC-64 bits | | EPC-96 bits | |
| --- | --- | --- | --- | --- |
|  | bit | time (us) | bit | time (us) |
| Query | 4 | 6.4 | 4 | 6.4 |
| RN16 | 16 | 25.6 | 16 | 25.6 |
| ACK | 18 | 28.8 | 18 | 28.8 |
| PC | 16 | 25.6 | 16 | 25.6 |
| CRC16 | 16 | 25.6 | 16 | 25.6 |
| EPC | 64 | 102.4 | 96 | 153.6 |
| T1 | — | 33.3 | — | 33.3 |
| T2 | — | 32 | — | 32 |

When the number of tags is n and access probability is p, a probability that each reaction state will be generated depends on the following Equation 3.

$$P_S = n \times p \times (1-p)^{n-1}$$

$$P_E = (1-p)^n$$

$$P_C = 1 - P_S - P_E$$ [Equation 3]

where Ps is a probability that the success slot will be generated and $P_E$ is a probability that the idle slot will be generated, which can be obtained by $(1-p)^n$, and Pc is a probability that the collision slot will be generated, which can be obtained by $(1-P_S-P_E)$.

If all the slot sizes are the same, the access probability p corresponds to an inverse number of the frame size. In other words, since the frame size is the number of slots, when all the slot sizes are the same, the access probability p corresponds to the inverse number of the number of slots within one frame.

Based on this, the expected throughput reflecting the slot length can be obtained according to the following Equation 4.

$$TH(N, p) = \frac{T_S \times P_S}{T_S \times P_S + T_C + P_C + T_E \times P_E}$$ [Equation 4]

The expected throughput reflecting the slot length can be obtained by a rate of the success slot with respect to the success, collision, and idle slots using the success, collision, and idle slot lengths represented by Equation 4.

When applying probability of Equation 3 to Equation 4, when the number of tags is n (or N) and the access probability is p, the throughput reflecting the slot length can be obtained by the following Equation 6.

$$TH(N, p) = \frac{T_S \times N \times p \times (1-p)^{n-1}}{T_C + (T_S - T_C) \times N \times p \times (1-p)^{n-1} + (T_E - T_C) \times (1-p)^n}$$ [Equation 6]

The frame size capable of minimizing the tag recognition time can be obtained through the throughput reflecting the slot length.

Figure 5:
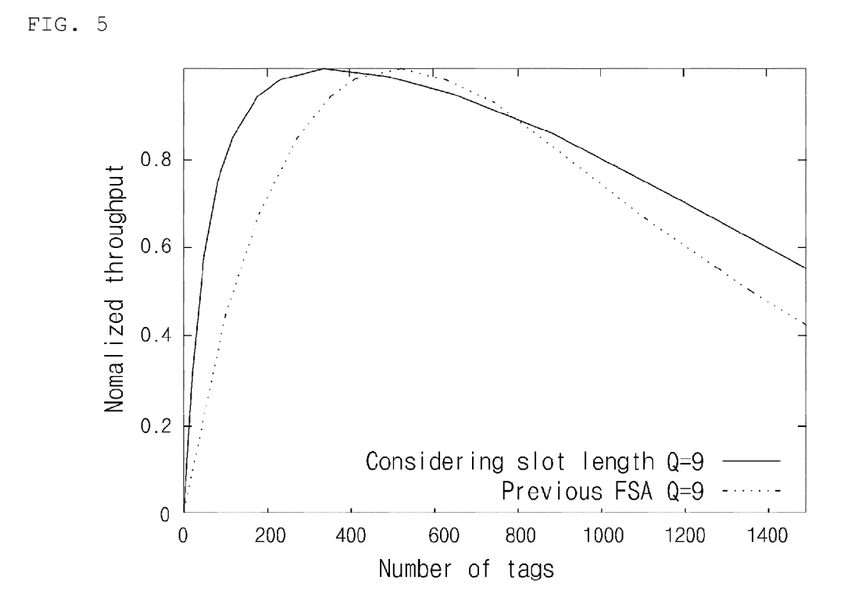
FIG. 5 is a graph comparing the throughput according to the number of tags in the case of using the FSA anti-collision algorithm according to the related art and the throughput according to the number of tags of the method for recognizing a tag in consideration of the slot length according to the embodiment of the present invention when the current frame size is defined.

When determining each configuration element length of the slot according to the above Table 1 based on the EPC Generation 2 standard, the throughput curved line can be obtained as shown in FIG. 5.

FIG. 5 is a graph comparing the throughput according to the number of tags in the case of using the FSA anti-collision algorithm and the throughput according to the number of tags of the method for recognizing a tag in consideration of the slot length according to the embodiment of the present invention when the current frame size (=2Q) is defined.

Referring to FIG. 5, when the current frame size is $2^Q$(Q=9), a dotted line represents a normalized throughput according to the number of tags in the case of using the FSA anti-collision algorithm according to the related art and a solid line represents a normalized throughput according to the number of tags of the method for recognizing a tag in consideration of the slot length according to one exemplary embodiment of the present invention. From FIG. 5, the optimal frame size capable of minimizing the tag recognition time meeting the current number of tags for the current frame size can be obtained.

In order to obtain the optimal frame size capable of minimizing the tag recognition time, when seeking the access probability (p) having the maximum throughput for the current number of tags, the frame size that minimizes the tag recognition time can be sought. The reason is that the access probability (p) is the inverse number ($1/2^Q$) of the frame size.

In order to seek the maximum throughput, the throughput reflecting the slot length according to Equation 6 is differentiated with respect to the access probability (p), a primary differential of the throughput reflecting the slot length can be represented by the following Equation 7.

$$\left.\frac{dTH}{dp}\right|_N = T_C \times (1-p) - \quad \text{[Equation 7]}$$
$$T_C \times (n-1)p + (T_E - T_C)(1-p)^n$$
$$= 0$$

Since it requires much cost to implement the anti-collision protocol when considering Equation 7 with respect to the access probability (p), it is preferable to use another alternative method.

First, a substitution method can be used. For the given number (n or N) of tags, the access probability that a primary differential value of Equation 7 has 0 value is sought by substituting a value from 0 to 1 as the access probability (p). With this access probability, the frame size minimizing the tag recognition time can be sought very accurately.

Second, an optimization method can be used. For example, the access probability having 0 value obtained by the primary differential can be sought more rapidly than the substitution method by using the steepest descent method and a Newton method. When using the steepest descent method and the Newton method, an error in the error range may occur.

The frame size minimizing the tag recognition time can be sought based on the substitution method or the optimization method. The frame size minimizing the recognition time according to one exemplary embodiment of the present invention, which is sought by the above methods, is as shown in FIG. 6.

Figure 6:
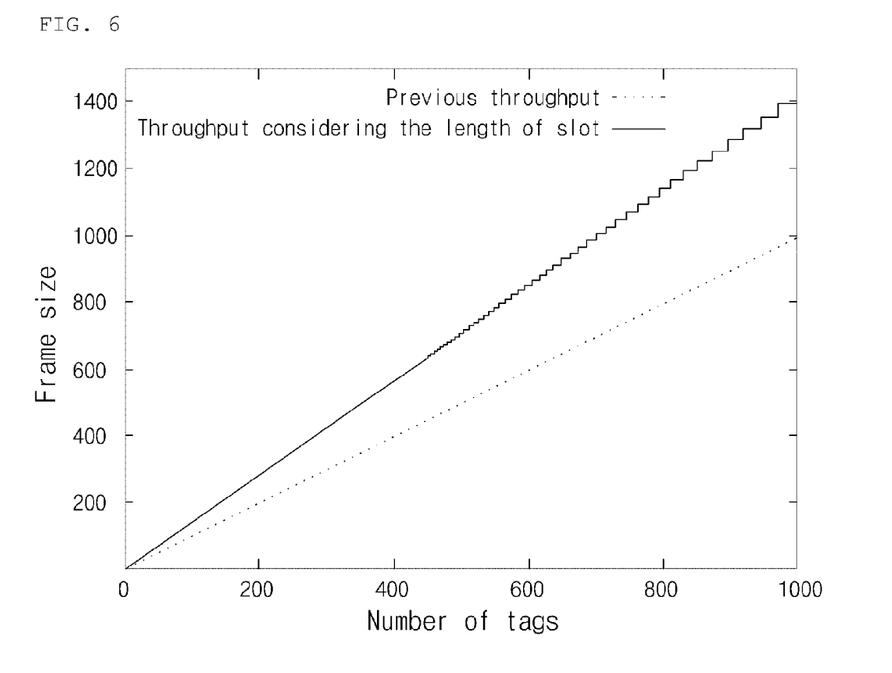
FIG. 6 is graph showing the frame size obtained by the FSA protocol according to the related art and the frame size minimizing the tag recognition time obtained by the method in consideration of the slot length according to the embodiment of the present invention.

FIG. 6 is graph showing the frame size obtained by the FSA protocol according to the related art and the frame size minimizing the tag recognition time obtained by the method in consideration of the slot length according to the embodiment of the present invention. FIG. 7 is graph showing the Q value obtained by the FSA protocol according to the related art and the Q value minimizing the tag recognition time obtained by the method in consideration of the slot length according to the embodiment of the present invention.

The frame size minimizing the tag recognition time obtained by the method in consideration of the slot length according to one exemplary embodiment of the present invention and the existing optimal frame size can be compared from FIG. 6.

When using the Q algorithm disclosed in EPC Generation 2 standard based on this, the tag range meeting each Q value can be obtained. Herein, the frame size of the Q-algorithm is determined by Q (frame size=$2^Q$).

The Q value obtained by the method in consideration of the slot length according to one exemplary embodiment of the present invention and the Q value obtained from the throughput in the FSA protocol according to the related art can be compared from FIG. 7. Even when using the Q-algorithm through the Q value obtained from the throughput reflecting the slot length according to one exemplary embodiment of the present invention, the frame size minimizing the tag recognition time according to the number of tags can be obtained.

Table 2 is a table that indicates the optimal Q value obtained by the method in consideration of the slot length according to one exemplary embodiment of the present invention of FIG. 7 and the number of tags corresponding thereto, when using the Q-algorithm.

TABLE 2

| Q | Number of tags |
|---|---|
| 2 | 0~4 |
| 3 | 5~8 |
| 4 | 9~15 |
| 5 | 16~31 |
| 6 | 32~63 |
| 7 | 64~126 |
| 8 | 127~253 |
| 9 | 254~505 |
| 10 | 506~1011 |
| 11 | 1012~2023 |
| 12 | 2024~4047 |
| 13 | 4048~8093 |
| 14 | 8094~16187 |
| 15 | 16188~32375 |

As indicated in Table 2, the optimal frame size, for example, the Q value for the number of tags is previously determined and is stored in the RFID reader in a lookup table, such that it can be simply implemented without calculating the optimal frame size every time.

Figure 8:
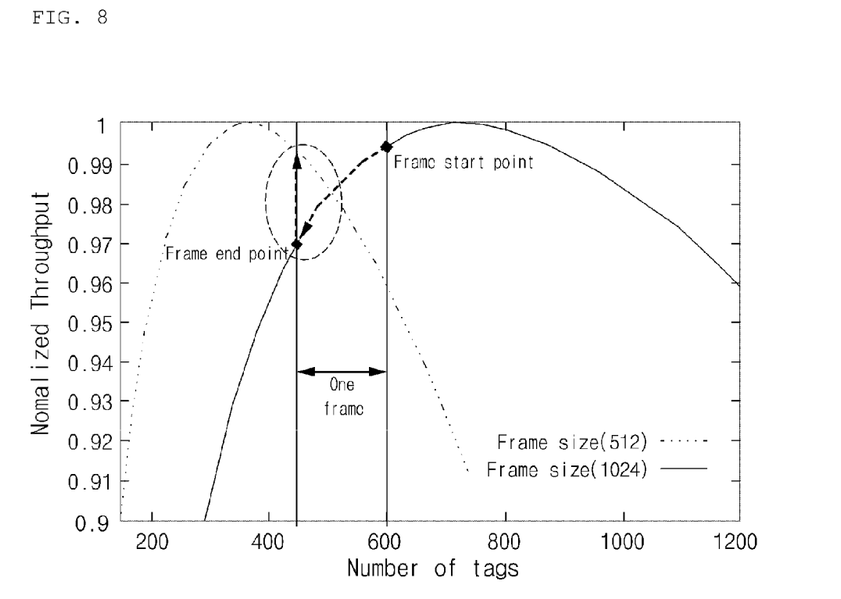
FIG. 8 is a graph for explaining the throughput degradation occurring in the FSA anti-collision algorithm.

FIG. 8 is a graph for explaining the throughput degradation occurring in the FSA anti-collision algorithm.

When obtaining the frame size capable of minimizing the tag recognition time within the FSA anti-collision algorithm according to the related art, as shown in FIG. 8, the throughput loss occurs by the throughput inversion phenomenon involved in the FSA anti-collision algorithm, such that the tag recognition time cannot be minimized.

FIG. 8 shows an example of the throughput inversion phenomenon of the FSA anti-collision algorithm according to the related art. In the RFID system using the Q-algorithm, as shown in FIG. 8, when the number of tags is 600, it can be appreciated from Table 2 that the suitable Q value is 10 (frame size=1024). However, as shown in FIG. 8, at the moment that the tag is recognized and the remaining tags are 505, the case when the Q value is 9 (frame size=512) becomes higher in the throughput than the case when the Q value is 10 (frame size=1024), the throughput inversion phenomenon occurs.

Until the counting from 505 tags to the remaining number of slots ends, the throughput loss occurs due to the throughput inversion phenomenon.

In order to prevent the throughput inversion phenomenon, one exemplary embodiment of the present invention proposes the high-speed RFID tag anti-collision algorithm capable of controlling the frame size. In order to prevent the throughput inversion phenomenon according to one exemplary embodiment of the present invention, the high-speed RFID tag anti-collision algorithm capable of controlling the frame size stops the frame that is being currently progressed when the number of tags to be recognized has an inappropriate frame size within the frame progressing the current tag recognition.

For the remaining number of tags to be recognized within the frame progressing the current tag recognition, a frame having a new size where the throughput inversion phenomenon does not occur, such that the frame starts again.

Figure 10:
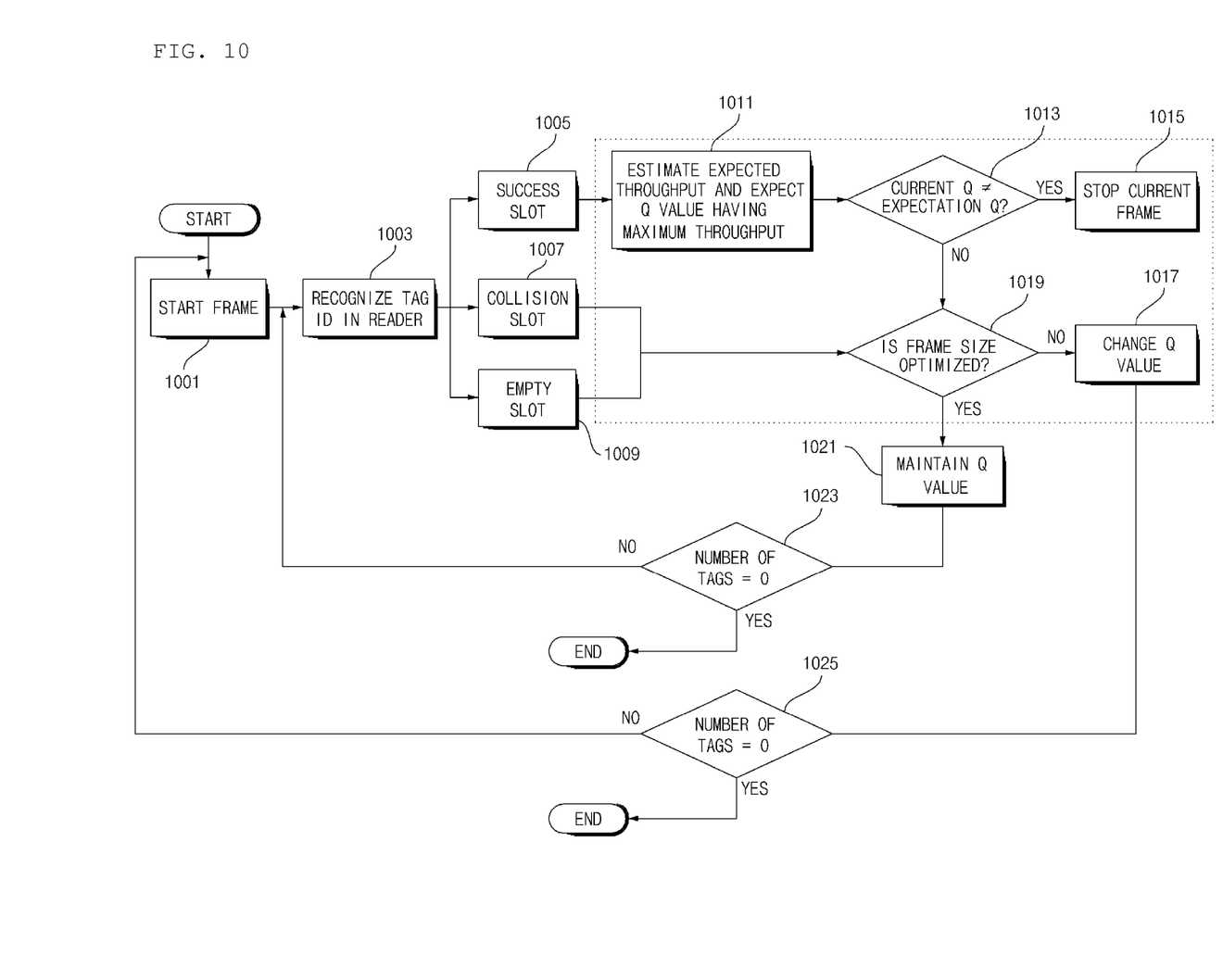
FIG. 10 is a flowchart for explaining a high-speed RFID tag anti-collision algorithm capable of controlling the frame size according to the exemplary embodiment of the present invention.

FIG. 10 is a flowchart for explaining the high-speed RFID tag anti-collision algorithm capable of controlling the frame size according to the exemplary embodiment of the present invention.

Referring to FIG. 10, if the tag recognition process starts, a frame having a predetermined size starts (step 1001) and the reader recognizes the ID of the tag (step 1003). The frame size, which is configured of a plurality of slots, is equal to the number of slots.

The tags receiving the signals from the readers respond to the readers and divide the response results of the tags into success (step 1005), collision (step 1007), and idle (or empty, step 1009).

In the success slot, only one tag responds to one timeslot and the reader recognizes the tag. In the idle slot, no tag responds to one timeslot. In the collision slot, two tags or more respond to one timeslot.

When the response result of the tag is success, the reader recognizes the tag within the frame progressing the current tag recognition, estimates (Equation 4) the expected throughput reflecting the slot length according one exemplary embodiment of the present invention based on the remaining number of tags except for the recognized tags, and estimates the Q value corresponding to the frame size having the maximum throughput in order to minimize the tag recognition time (step 1011). The Q can be obtained by estimation every time, but obtained using the previously obtained value as indicated in Table 2 corresponding to the remaining number of tags except for the recognized tags.

As a result of determining whether the current Q value is different from the estimated Q value (step 1013), when the current Q value is different from the estimated Q value, it is determined that the number of tags to be recognized has an inappropriate frame size. As a result, the frame that is being currently progressed stops (step 1015). After changing the estimated Q value corresponding to the frame size having the maximum throughput for the remaining number of tags to be recognized within the frame progressing the current tag recognition (step 1017), it is determined whether the remaining number of tags is 0 (step 1021). If the remaining number of tags is 0, the tag recognition process ends and if the remaining number of tags is not 0, the frame starts again (step 1001).

Figure 9:
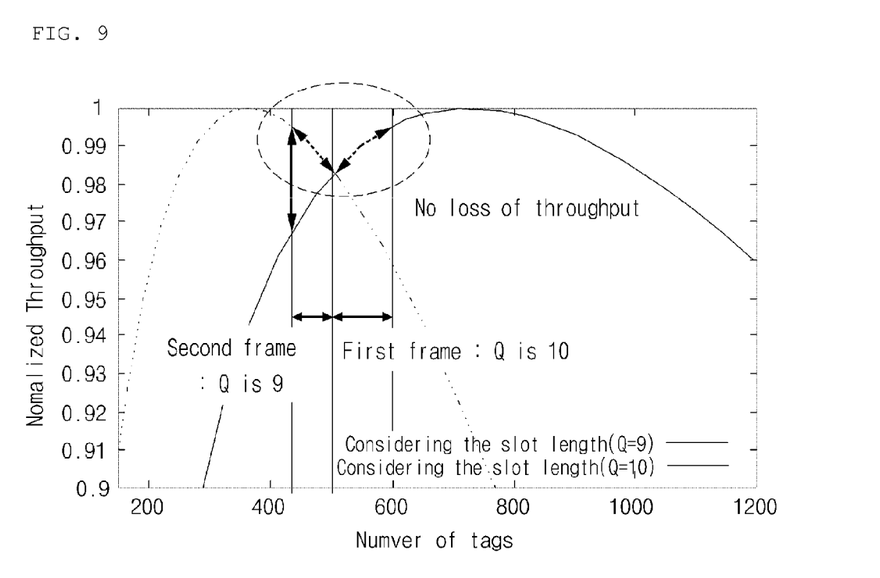
FIG. 9 is a graph for explaining a process changing the Q value to prevent the throughput inversion phenomenon according to one exemplary embodiment of the present invention.

FIG. 9 is a graph for explaining a process changing the Q value to prevent the throughput inversion phenomenon according to one exemplary embodiment of the present invention. Before the throughput degradation occurs, the current frame stops and a new frame having a new frame size starts. As shown in FIG. 9, when the number of tags is 505, the current frame (herein, as an example, first frame) where the Q value is 10 stops and the frame size where the Q value is 9 is determined, the new frame (herein, as an example, second frame) starts. The throughput inversion phenomenon can be prevented by the above methods.

Referring back to FIG. 10, as a determination result of step 1013, when the current Q value is equal to the estimated Q value, it branches to step 1019 for determining whether the current frame size is optimized.

When the response result of the tag is collision or idle, the reader determines whether the current frame size is optimized (step 1019). Herein, the optimization means the case where the current Q values is a Q value that does not cause the throughput inversion phenomenon for the remaining number of tags to be recognized within the frame progressing the current tag recognition. As the determination result, when the optimization is not achieved, after changing the current Q value into the Q value that does not cause the throughput inversion phenomenon for the remaining number of tags to be recognized within the frame progressing the current tag recognition (step 1017), it is determined whether the remaining number of tags is 0 (step 1021). If the remaining number of tags is 0, the tag recognition process ends and if the remaining number of tags is not 0, the frame starts again (step 1001).

When the response result is the collision or the idle, the reader maintains the current Q value when the current frame size is optimized (step 1021) and then determines whether the remaining number of tags is 0 (step 1021). If the remaining number of tags is 0, the tag recognition process ends and if the remaining number of tags is not 0, it branches to a process (step 1003) of recognizing the ID of the tag in the reader.

The RFID tag can be recognized at high speed by preventing the throughput inversion phenomenon and using the frame size capable of minimizing the tag recognition time according to one exemplary embodiment of the present invention, by repeating the above processes.

The method of recognizing a tag that can prevent the throughput inversion phenomenon and minimize the tag recognition time according to one exemplary embodiment of the present invention is performed in the RFID reader. Although not shown in the drawings, the RFID reader may include a plurality of RFID tags, a transceiver that transmits and receives a signal, and a controller that performs the method of recognizing a tag capable of preventing the throughput inversion phenomenon and minimizing the tag recognition time according to one exemplary embodiment of the present invention.

In detail, the controller obtains the expected frame size in the case where the throughput obtained by reflecting the slot length based on the remaining number of tags except for the recognized tags within the frame progressing the current tag recognition that substantially has the maximum value. When the current frame size is different from the expected frame size, the controller stops the frame that is being currently progressed and changes the current frame size into the predetermined frame size. When the current frame size is equal to the predetermined frame size, the controller changes the current frame size into the frame size that does not cause the throughput inversion phenomenon for the remaining number of tags to be recognized within the frame progressing the current tag recognition.

Figure 11:
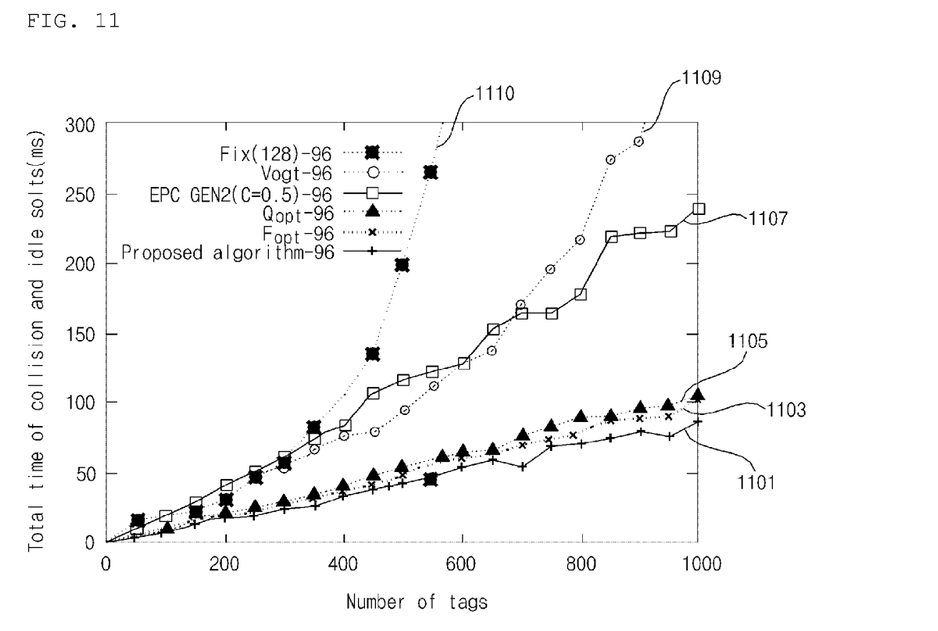
FIG. 11 is a graph showing performance evaluation results obtained by comparing the recognition time generated by the collision and idle slots.
Figure 12:
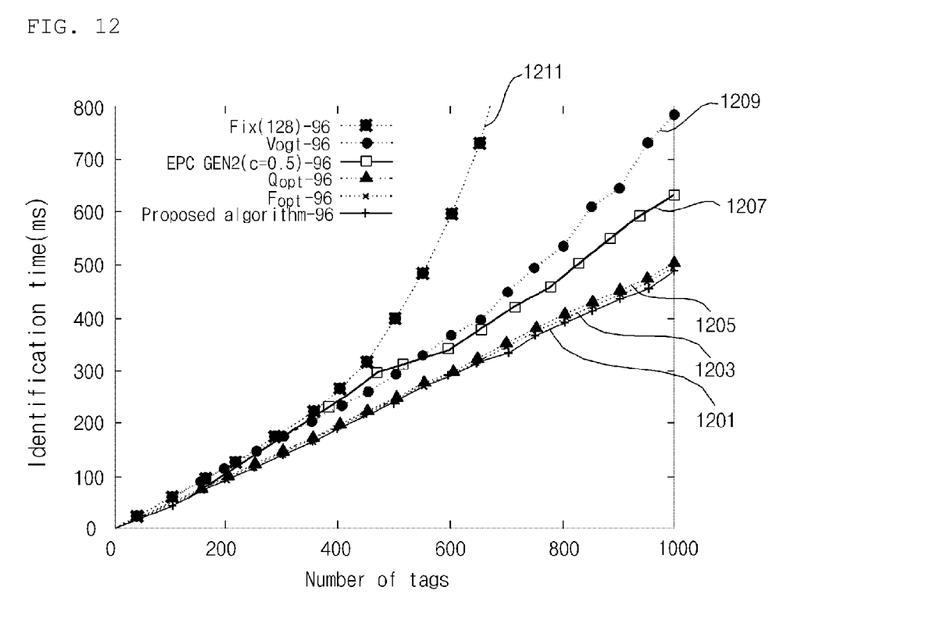
FIG. 12 is a graph showing performance evaluation results obtained by comparing the entire recognition time.
Figure 13:
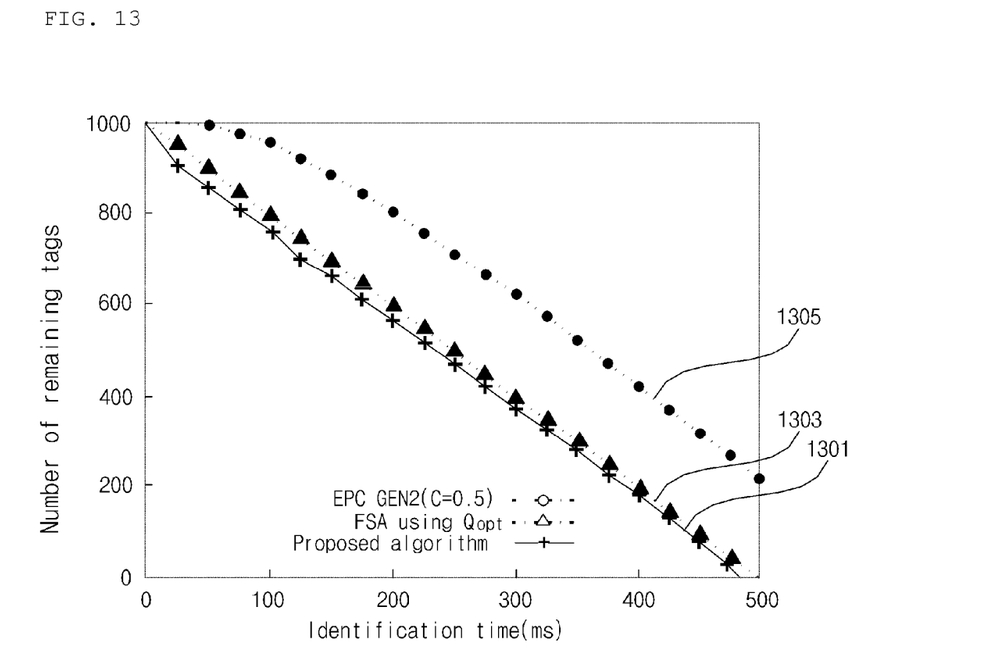
FIG. 13 is a graph showing performance evaluation results obtained by comparing the tag recognition speeds when the number of tags is 1000.

FIGS. 11 to 13 show evaluation results evaluating the performance of the method of recognizing a tag according to the exemplary embodiment of the present invention.

FIG. 11 is a graph showing the performance evaluation results obtained by comparing the tag recognition time between only the collision slots and the idle slots that are generated when recognizing all the given number of tags.

Referring to FIG. 11, when comparing a graph 1101 showing the recognition time of the method of recognizing a tag capable of minimizing the tag recognition time according to the exemplary embodiment of the present invention, a graph 1107 showing the recognition time when applying the FSA tag anti-collision algorithm of EPC Generation 2, and graphs 1110, 1109, 1105, and 1103 showing the recognition time when applying another tag anti-collision algorithm in the related art, it can be appreciated that the recognition time according to the method of recognizing a tag capable of minimizing the tag recognition time according to one exemplary embodiment of the present invention consumes the recognition time corresponding to about 35% to about 40% with respect to the recognition time when applying the FSA tag anti-collision algorithm of EPC Generation 2 according to the related art.

FIG. 12 is a graph showing the performance evaluation results obtained by comparing a total recognition time consumed to recognize all the given number of tags.

Referring to FIG. 12, when comparing a graph 1201 showing the total recognition time of the method of recognizing a tag capable of minimizing the tag recognition time according to one exemplary embodiment of the present invention, a graph 1207 showing the total recognition time when applying the FSA tag anti-collision algorithm of EPC Generation 2, and graphs 1211, 1209, 1205, and 1203 showing the total recognition time when applying another tag anti-collision algorithm in the related art, it can be appreciated that the total recognition time of the method of recognizing a tag according to one exemplary embodiment of the present invention is about 75, with respect to the case of applying the FSA tag anti-collision algorithm of EPC Generation 2 according to the related art. Therefore, the method of recognizing a tag according to one exemplary embodiment of the present invention has the shorter recognition time by about 2 to 3% than the FSA protocol anti-collision algorithm having the frame size capable of minimizing the total recognition time in the related art.

FIG. 13 is a graph showing the performance evaluation results obtained by comparing the tag recognition speeds when the number of tags is 1000.

FIG. 13 shows one measuring the remaining number of tags every predetermined period when the number of tags is 1000, wherein the tag recognition speed can be obtained by measuring the recognized number of tags for every predetermined period.

Referring to FIG. 13, when comparing a graph 1301 showing the remaining number of tags for every predetermined period of the method of recognizing a tag capable of minimizing the tag recognition time according to the exemplary embodiment of the present invention, a graph 1305 showing the remaining number of tags for every predetermined period when applying the FSA tag anti-collision algorithm of EPC Generation 2, and a graph 1303 showing the remaining number of tags for every predetermined period when applying the FSA tag anti-collision algorithm having the Q value minimizing the recognition time in the related art, it can be appreciated that the tag recognition speed according to the method of recognizing a tag capable of minimizing the tag recognition time according to one exemplary embodiment of the present invention can read a higher number of tags by 39.1% than EPC Generation 2 protocol according to the related art. This can read the number of tags by more than 8% in the case when applying the FSA anti-collision algorithm having the Q value minimizing the recognition time in the related art. This can be appreciated from FIG. 14.

Figure 14:
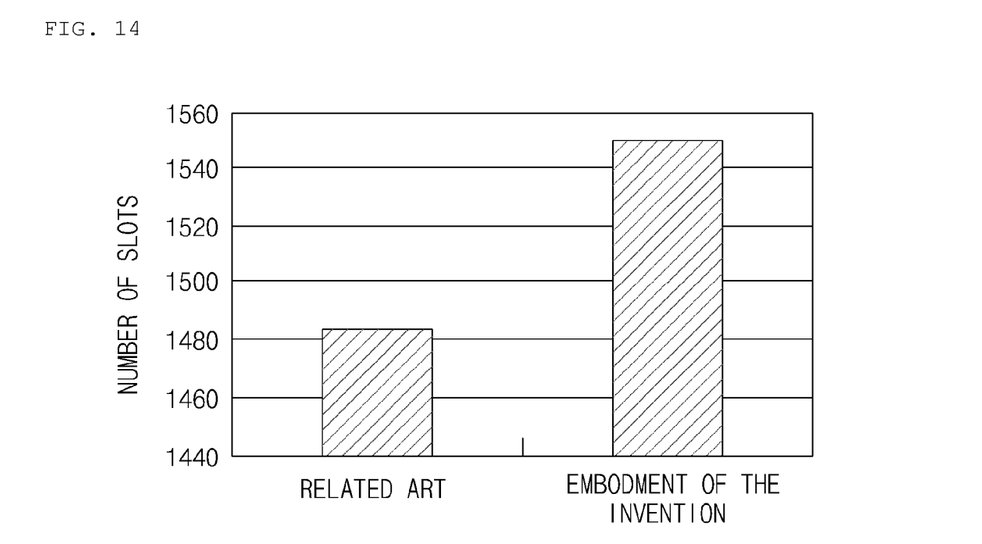
FIG. 14 is a graph comparing the number of slots in an analysis result in the FSA protocol according to the related art and an analysis result according to the exemplary embodiment of the present invention, when the number of tags is 550.
Figure 15:
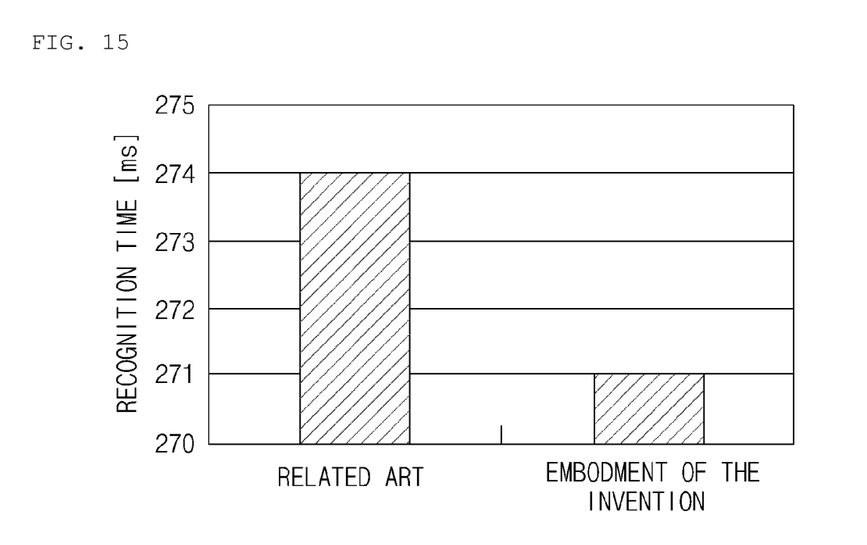
FIG. 15 is a graph comparing the tag recognition time in an analysis result in the FSA protocol according to the related art and an analysis result according to the exemplary embodiment of the present invention, when the number of tags is 550.

FIG. 14 is a graph comparing the number of slots necessary to recognize all the tags in the analysis results according the FSA method according to the related art and the analysis results according to the method of recognizing a tag according to the exemplary embodiment of the present invention when the number of tags is 550, FIG. 15 is a graph comparing recognition time necessary to recognize all the tags in the analysis results according the FSA method according to the related art and the analysis results according to the method of recognizing a tag according to the exemplary embodiment of the present invention when the number of tags is 550.

Referring to FIG. 14, it can be appreciated that the method of recognizing a tag according to one exemplary embodiment of the present invention needs the more number of slots to recognize the tags than the FSA protocol according to the related art when the number of tags is 550. Referring to FIG. 15, it can be confirmed that the method of recognizing a tag according to one exemplary embodiment is less in the tag recognition time than the FSA protocol according to the related art.

It will be appreciated by those skilled in the art that various modifications, changes, and substitutions can be made without departing from the spirit and scope of the present invention defined in the following claims.

What is claimed is:

1. A method of recognizing a plurality of RFID tags in an RFID reader, comprising:
    obtaining an expected frame size in the case where throughput obtained by reflecting a slot length based on the number of remaining tags except for recognized tags within a frame progressing current tag recognition that substantially has a maximum value; and
    when the current frame size is different from the predetermined frame size, stopping the current progress of frame and changing the current frame size into the predetermined frame size,
    wherein the throughput obtained by reflecting the slot length is obtained by a rate of a success slot with respect to all the success, collision, and idle slots using the success, collision, and idle slot lengths, and
    wherein the throughput is defined by the following equation, $$TH(n, p) = \frac{T_S P_S}{T_S P_S + T_C P_C + T_E P_E}$$

in which TH is the throughput which is a function of n number of tags and p access probability, $P_S$ is a probability that the success slot will be generated, $P_E$ is a probability that the idle slot will be generated, $P_C$ is a probability that the collision slot will be generated, Ts is a success slot length, Tc is a collision slot length, and $T_E$ is an idle slot length.

2. The method of recognizing a plurality of tags in an RFID reader according to claim 1, wherein the obtaining the predetermined frame size is performed when a tag response result is a success slot.

3. The method of recognizing a plurality of tags in an RFID reader according to claim 1, further comprising: when the current frame size is equal to the predetermined frame size, changing the current frame size into the frame size that does not cause a throughput inversion phenomenon for the number of remaining tags to be recognized within the frame progressing the current tag recognition.

4. The method of recognizing a plurality of tags in an RFID reader according to claim 1, wherein the current frame size and the expected frame size use a Q value corresponding to the frame size obtained by applying a Q algorithm, wherein the frame size is $2^Q$.

5. An RFID reader, comprising:
a transceiver that transmits and receives signals to and from a plurality of RFID tags; and
a controller that obtains an expected frame size in the case where throughput obtained by reflecting a slot length based on the number of remaining tags except for recognized tags within a frame progressing current tag recognition substantially has a maximum value and when the current frame size is different from the expected frame size, stops the current progress of frame and changes the current frame size into the expected frame size,
wherein the throughput obtained by reflecting the slot length is obtained by a rate of a success slot with respect to all the success, collision, and idle slots using the success, collision, and idle slot lengths, and
wherein the throughput is defined by the following equation, $$TH(n, p) = \frac{T_S P_S}{T_S P_S + T_C P_C + T_E P_E}$$

in which TH is the throughput which is a function of n number of tags and p access probability, $P_S$ is a probability that the success slot will be generated, $P_E$ is a probability that the idle slot will be generated, $P_C$ is a probability that the collision slot will be generated, Ts is a success slot length, Tc is a collision slot length, and $T_E$ is an idle slot length.

6. The RFID reader according to claim 5, wherein the controller obtains the expected frame size when a tag response result is a success slot.

7. The RFID reader according to claim 5, wherein the controller changes the current frame size into the frame size that does not cause a throughput inversion phenomenon for the number of remaining tags to be recognized within the frame progressing the current tag recognition, when the current frame size is equal to the expected frame size.

8. The RFID reader according to claim 5, wherein the current frame size and the expected frame size use a Q value corresponding to the frame size obtained by applying a Q algorithm, wherein the frame size is $2^Q$.

9. A method of recognizing a plurality of RFID tags in an RFID reader, comprising:
obtaining an expected frame size in the case where throughput reflecting a slot length substantially has a maximum value, where the throughput is obtained by a rate of a success slot with respect to the success, collision, and idle slots using the success, collision, and idle slot lengths based on the number of remaining tags except for recognized tags within a frame progressing current tag recognition; and
if a current frame size is different from the expected frame size, stopping the current progress of frame and changing the current frame size into the expected frame size, and
wherein the throughput is defined by the following equation, $$TH(n, p) = \frac{T_S P_S}{T_S P_S + T_C P_C + T_E P_E}$$

in which TH is the throughput which is a function of n number of tags and p access probability, $P_S$ is a probability that the success slot will be generated, $P_E$ is a probability that the idle slot will be generated, $P_C$ is a probability that the collision slot will be generated, Ts is a success slot length, Tc is a collision slot length, and $T_E$ is an idle slot length.

10. The method of claim 9, wherein the obtaining the expected frame size is performed when a tag response result is a success slot.

11. The method of claim 9, further comprising: when the current frame size is equal to the expected frame size, changing the current frame size into the frame size that does not cause a throughput inversion phenomenon for the number of the remaining tags to be recognized within the frame progressing the current tag recognition.

12. The method of claim 9, wherein the current frame size and the expected frame size use a Q value corresponding to the frame size obtained by applying a Q algorithm, wherein the frame size is $2^Q$.

13. An RFID reader, comprising:
a transceiver configured to transmits and receives signals to and from a plurality of RFID tags; and
a controller configured to obtains an expected frame size in the case where throughput reflecting a slot length substantially has a maximum value, where the throughput is obtained by a rate of a success slot with respect to all the success, collision, and idle slots using the success, collision, and idle slot lengths based on the number of remaining tags except for recognized tags within a frame progressing current tag recognition, stops the current progress of frame if the current frame size is different from the expected frame size and changes the current frame size into the expected frame size, and
wherein the throughput is defined by the following equation, $$TH(n, p) = \frac{T_S P_S}{T_S P_S + T_C P_C + T_E P_E}$$

in which TH is the throughput which is a function of n number of tags and p access probability, $P_S$ is a probability that the success slot will be generated, $P_E$ is a probability that the idle slot will be generated, $P_C$ is a probability that the collision slot will be generated, Ts is a success slot length, Tc is a collision slot length, and $T_E$ is an idle slot length.

14. The RFID reader of claim 13, wherein the controller is configured to obtains the expected frame size when a tag response result is a success slot.

15. The RFID reader of claim 13, wherein the controller is configured to change the current frame size into the frame size that does not cause a throughput inversion phenomenon for the number of the remaining tags to be recognized within the frame progressing the current tag recognition, when the current frame size is equal to the expected frame size.

16. The RFID reader of claim 13, wherein the current frame size and the expected frame size use a Q value corresponding to the frame size obtained by applying a Q algorithm, wherein the frame size is $2^Q$.

* * * * *